US005455829A

United States Patent [19]
Klingberg

[11] Patent Number: 5,455,829
[45] Date of Patent: Oct. 3, 1995

[54] DELAY CIRCUIT FOR DE-INTERLEAVING ISDN CHANNELS

[75] Inventor: Jeffrey W. Klingberg, Ft. Worth, Tex.

[73] Assignee: Motorola, Inc., Schaumburg, Ill.

[21] Appl. No.: 206,285

[22] Filed: Mar. 7, 1994

Related U.S. Application Data

[63] Continuation of Ser. No. 827,129, Jan. 28, 1992, abandoned.

[51] Int. Cl.$^6$ ........................................... H04J 3/02
[52] U.S. Cl. ..................... 370/105.2; 370/108; 370/112; 370/118; 375/240
[58] Field of Search ............................... 370/58.1, 58.2, 370/105.2, 108, 112, 118; 375/122

[56] References Cited

U.S. PATENT DOCUMENTS

| | | | |
|---|---|---|---|
| 3,670,165 | 6/1972 | Kinsel | 370/112 X |
| 4,682,327 | 7/1987 | Okumura et al. | 370/105.2 |
| 4,754,450 | 6/1988 | Lynk, Jr. et al. | 370/118 X |
| 4,791,628 | 12/1988 | Swartz | 370/112 |
| 4,805,165 | 2/1989 | Kawamura et al. | 370/112 X |

OTHER PUBLICATIONS

ISDN '90 Proceedings, Hedges, N., "British Telecom's ISDN Service", pp. 8–10, Jun. 1990.
ISDN '90 Proceedings, Agard, S., "Broadband ISDN: A Migration Strategy from Today's Networks", pp. 33–36, Jun. 1990.
ISDN '90 Proceedings, Muller, N., "Facility-Based Fusion Yields Fractional ISDN", pp. 71–76, Jun. 1990.

*Primary Examiner*—Douglas W. Olms
*Assistant Examiner*—Russell W. Blum
*Attorney, Agent, or Firm*—Kevin A. Buford; Jon P. Christensen

[57] ABSTRACT

A method of de-interleaving ISDN channels for an information signal transceived through an ISDN interface.

15 Claims, 2 Drawing Sheets

DELAY CIRCUIT FOR DE-INTERLEAVING ISDN CHANNELS

This is a continuation of application Ser. No. 07/827,129, filed Jan. 28, 1992 and now abandoned.

FIELD OF THE INVENTION

The invention relates to signal processing and more specifically to digital signal processing.

BACKGROUND OF THE INVENTION

Integrated services digital networks (ISDNs) are known. Such networks are capable of providing communication services over wide areas and may include, in addition to basic telephone service, such services as call forwarding, call transfers, high speed data transfers, etc.

ISDN features may be accessed from a telephone console or interconnected data processor. ISDN features may be specified for each transaction or may be entered on a semipermanent basis and changed only as needed.

ISDN services may be procured over bearer ("B") channels and associated signalling ("D") channels. The B channel typically allows data transfers at a 64 kilobyte/second rate. The D channel typically transfers control information at a 16 kilobyte/second rate. The D channel is typically used for system set-up and for control of B channels.

B channels under ISDN may be offered in pairs within a basic rate interface (BRI) channel allowing a maximum data transfer rate of 144 kilobyte/second over a single data link including two B channels and an associated D channel. The BRI is also typically referred to as a 2B+D channel as a reflection of included data channels. Examples of such channel configurations and usage may be better understood by reference to the publication "ISDN '90 Proceedings" (available from Information Gatekeepers, Inc., 214 Harvard Ave., Boston, Mass. 02134) incorporated herein by reference.

Subscriber access to a BRI channel may be obtained through use of a terminal adapter designed for interconnecting a BRI to subscriber equipment accessible by an end user. The function of a terminal adapter is typically to separate (de-interleave) BRI channels into useable data streams for subscriber equipment. Subscriber equipment may include such devices as telephones, personal computers, fax machines, etc.

Shown, generally, in FIG. 1 is a prior art terminal adapter for interconnecting a BRI to end user. Such a terminal adapter may be used to support exchange of voice information on a B1 channel and data on a B2 channel (for a better understanding of the FIG. 1 terminal adapter, please see publication no. MC145488/D available from Motorola, Inc.).

Within such a terminal adapter the BRI (B1, B2, and D channels) may be interconnected with the terminal adapter through an "ISDN S/T INTERFACE". Voice information on a B1 channel may be exchanged through the terminal adapter with a telephone connected to a terminal labeled "TO TELEPHONE HEADSET". Data on a B2 channel may be exchanged with a subscriber's computer through a terminal labeled "TO EIA-232 TERMINAL". BRI control information (D channel information) may be exchanged with an operator from a keyboard/display through an interconnect on the terminal adapter labeled "KEYPAD & DISPLAY".

Terminal adapters, as is known in the art, are microprocessor intensive in construction. The terminal adapter (FIG. 1), as shown, may require the use of at least three microprocessors (MC68HC05, DDLC, and MC68000) for separation of B1 and B2 channels. More complicated ISDN interfaces where the B1 and B2 channels service differing devices (with control functions imposed on a common D channel) may require the use of a digital signal processor (DSP) such as the Motorola DSP56000, available from Motorola, Inc, for proper exchange of information.

Cellular radiotelephone systems are also known. Such cellular systems typically consist of a number of cellular base sites (each with a service coverage area) providing cellular communication services over a wide area. Cellular telephones within the service coverage area of a base site may request and be granted access to the cellular system based upon information exchanged between the cellular telephone and base site. Cellular telephones may also request access to other, target cellular telephones in the same or other service coverage area served by the same or another base site.

Target cellular telephones typically are accessed through the generation of paging requests transmitted from selected base sites within a system. Target communication units receiving such requests typically respond identifying their presence within a particular service coverage area.

A cellular telephone may identify itself to a proximate base site through transmission of an access request or through a response to a paging request. In either case the cellular base site may proceed to set up a traffic channel between the cellular communication unit and base site.

The traffic channel set up between the communication unit and base site is typically spectrally limited. Such spectral limitation places limitations on information transfer rates between communication unit and base sites over an air-interface limitations on the order of 32 kbytes/second are typical of cellular communication units.

Because of spectral limitations on information transfer between cellular communication units and base sites, information transfers may be accommodated through an ISDN interconnect with a cellular base site but limited to a single B channel per traffic channel. Also, because of spectral limitations the 64 kbyte/s exchange rate of a B channel must be transcoded to a lower exchange rate (e.g. 32 kbyte/s). The second B channel within a BRI may be allocated by the base site to serve a second communication transaction involving a second communication unit, with the base site allocated the responsibility of generating certain control commands required in setting-up and controlling the BRI.

Also, because of spectral limitations, a B channel assigned to exchanging a communicated signal with a cellular communication unit must be transcoded to a lower information exchange rate to accommodate air-interface limitations between base sites and cellular communication units. Because of the lower information exchange rate and dissimilar data structures the base site must receive and reformat information exchanged between the BRI and communication unit.

Because of the importance of ISDN services a need exists for a simpler method of separating B channels at base sites. Such method should accommodate the independent allocation of B channels yet still retain the common control structure of the common D channel.

SUMMARY OF THE INVENTION

A method is disclosed of de-interleaving ISDN channels within an ISDN channel separator. The method includes the steps of generating a first and at least second channel synch pulse and de-interleaving the first and an at least second ISDN channel based, at least in part, upon the first and at least second channel synch pulse, respectively.

DETAILED DESCRIPTION OF THE PREFERRED EMBODIMENT

The solution to the problem of de-interleaving ISDN channels lies, conceptually, in generating channel sync pulses related to channel location within the signalling structure produced by an ISDN interface device. The channel sync pulses may then be used as markers facilitating the capture of individual channels from within the signalling structure.

Figure 1:
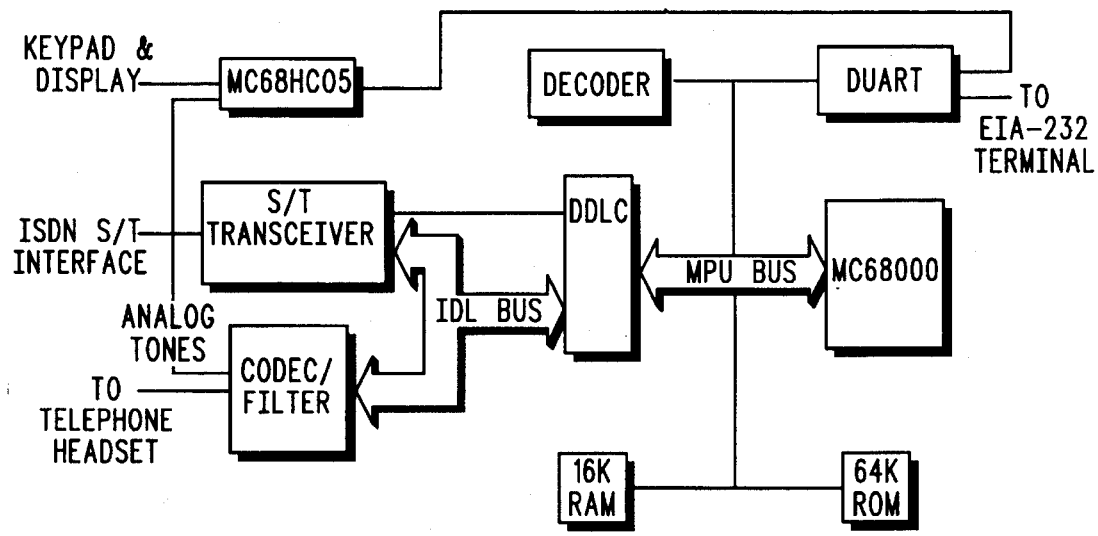
FIG. 1 depicts a block diagram of a prior art ISDN terminal adapter.
Figure 2:
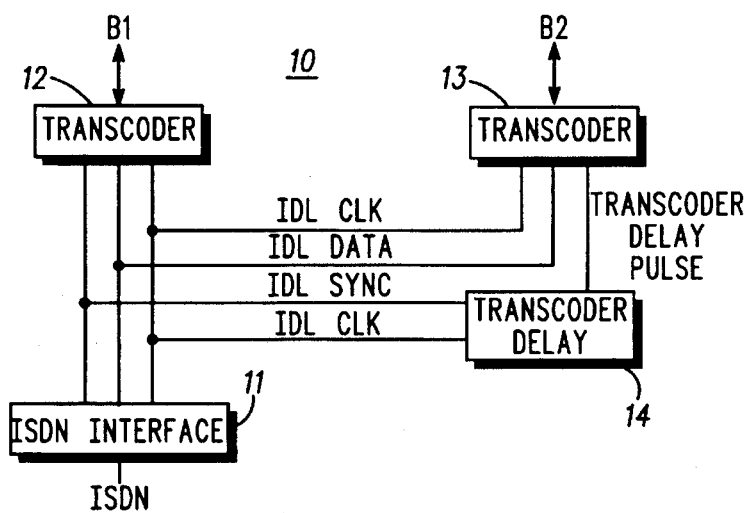
FIG. 2 an ISDN channel separator according to the invention.

Shown in FIG. 2 is an ISDN channel separator (10), generally, under the invention. Under the invention a channel separator (10) for a BRI may be comprised of an ISDN interface device (11), transcoders (12 and 13), and a transcoder delay device (14). Transcoders (12 and 13) may be an MC145532 ADPCM Transcoder available from Motorola, Inc. or equivalent. The transcoder delay (14) may be a MC140006B, 18-bit static shift register available from Motorola, Inc., or equivalent.

The ISDN interface device (11) may be a MC145474 ISDN S/T Interface Transceiver available from Motorola, Inc. (see Publication No. MC145474/D available from Motorola, Inc.), or equivalent. The ISDN interface device (11) may be used to provide modulation/line drive and demodulation/line receive functions for an ISDN network termination in conformance with CCITTI 1.430 and ANSI T1.605 specifications.

Figure 3:
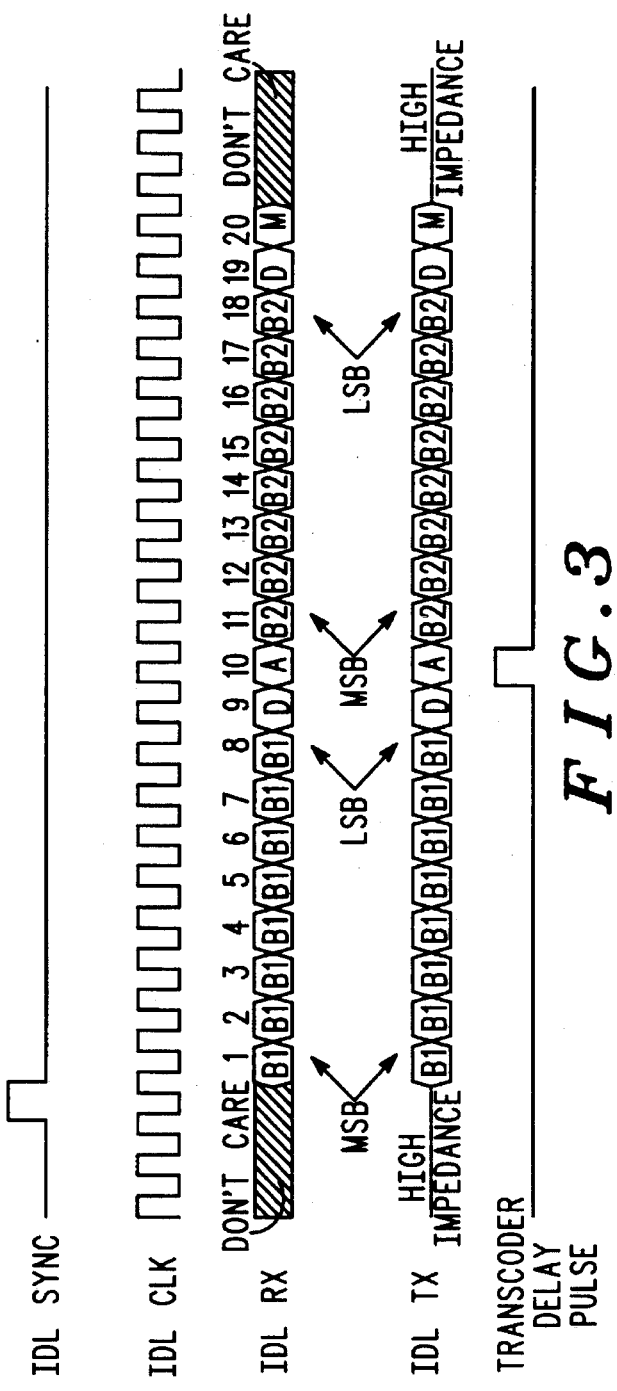
FIG. 3 is a timing diagram depicting relative locations of ISDN channels on an IDL bus.

Shown in FIG. 3 is a timing diagram of a signalling structure that may exist on the IDL bus of FIG. 2. The timing diagram (FIG. 3) represents the relative timing locations of the B1, B2, and D channels on the IDL bus and a format under which the ISDN interface device (11) may transceive data between transcoders (12 and 13) and the ISDN system.

As shown (FIG. 3) the timing diagram labeled "IDL SYNC" represents a signalling structure that may be found on the bus labeled "IDL SYNC" of FIG. 2. The timing diagram labeled "IDL CLK", likewise, may represent a clock signal that may be found on the bus labeled "IDL CLK" of FIG. 2. The timing diagram labeled "IDL RX" (FIG. 3) may represent data received by the ISDN Interface (11) on the bus labeled "IDL Data" (FIG. 2) from transcoders (12 or 13). The timing diagram labeled "IDL TX" (FIG. 3) may represent data transmitted by the ISDN Interface (11) on the bus labeled "IDL Data" (FIG. 2) to transcoders (12 or 13).

As shown (FIG. 3) bits 1–8 on a IDL RX terminal of the ISDN Interface (11) may represent data received from transcoder 12 for purposes of transmission into the ISDN system on a B1 channel and bits 11–18 may represent data received from transcoder 13 for transmission into the ISDN on a B2 channel. Conversely, bits 1–8 on a IDL TX terminal may represent data received from the ISDN system on a B1 channel and bits 11–18 may represent data transceived from the ISDN system on a B2 channel.

Also shown (FIG. 3) from the ISDN interface device (11) on an IDL SYNC terminal is an IDL SYNC pulse identifying the beginning of the ISDN interface signalling structure on the IDL bus. Also available from the ISDN interface device (11) on an IDL CLK terminal of the IDL bus is a clock signal. The IDL CLK signal may be used by transcoders 12 and 13 as an indication of the presence of bits 1–8 on the IDL bus following a channel sync pulse.

In accordance with the invention the transcoder delay device (14) has a jumper wire interconnected between two terminals [6 and 12] (not shown), an input on another terminal [4] and an output at still another terminal [9]. The transcoder delay (14) configured in such a manner provides a delay of 10 clock pulses between receipt of the IDL SYNC pulse coincident with the first clock pulse and generating a transcoder delay pulse coincident with the 11th clock pulse.

In operation transcoder 12 uses the IDL SYNC pulse as a channel sync pulse to exchange data with the ISDN system on the B1 channel. Transcoder 13, in turn uses the transcoder delay pulse as a channel sync pulse to exchange data with the ISDN system on the B2 channel.

Figure 4:
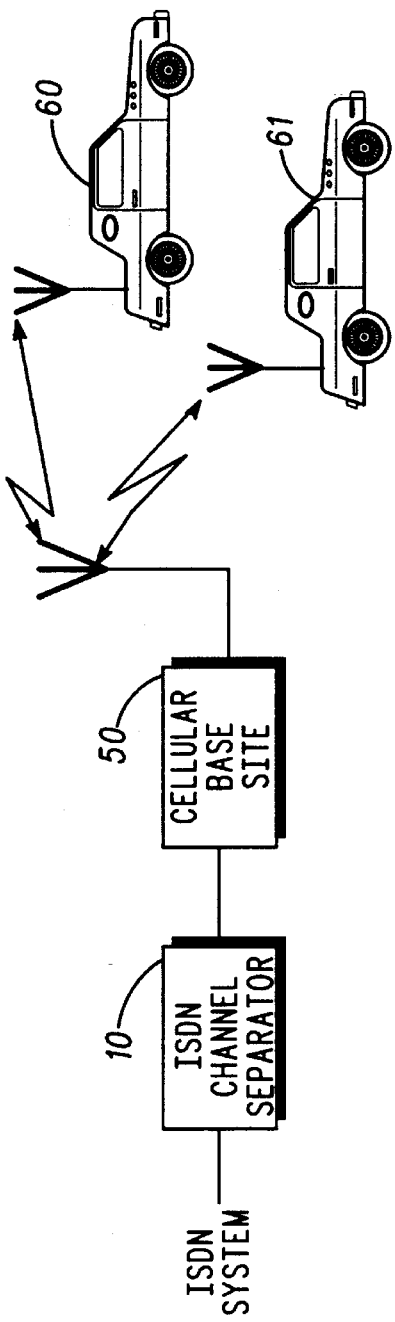
FIG. 4 depicts the application of an ISDN channel separator, according to the invention, at a cellular base site for communication transactions between a cellular subscriber and an ISDN subscriber.

By way of example the ISDN channel separator (10) may be used for the exchange of voice or data traffic between an public switch telephone (PSTN) subscriber and a mobile radiotelephone through a local cellular base station on a B1 or B2 channel of a BRI (FIG. 4). The ISDN channel separator (10) may also be used for the exchange of voice or data traffic between mobile radiotelephones through base stations at opposite ends of a BRI.

In such a case (FIG. 4) an interconnection between the ISDN system and a cellular base site (50) may be provided by an ISDN channel separator (10). Transcoders (12 and 13), in such case may be configured to exchange a communicated signal at 32 kbytes/second.

The cellular base site (50) may receive a request for communication access from a communication unit (60) for access to a first target (not shown). The base site (50) may grant communication resources for the exchange of a communicated signal between communication unit (60) and base site (50) under methods well known in the prior art.

The base site (50) may then establish a communication path between the requesting communication unit (60) and first target on a B1 channel of the BRI through information transmitted into the ISDN on the D channel of the BRI. The base site (50) may transmit such information through an interconnection (not shown) with the IDL bus of the ISDN channel separator (10). The base site may also monitor the state of the BRI by monitoring the D channel on the IDL bus for status information and by monitoring a serial control port (SCP) of the ISDN interface device (11).

While a communicated message is exchanged between the communication unit (60) and first target on the B1 channel, a second communication transaction may be established on the B2 channel. In such a case, a second communication unit (61) may request access to a second target (not shown). The base site (50) may allocated communication resources as above and assign such second communication transaction to the B2 channel.

In another embodiment of the invention an ISDN channel separator may be constructed for an E1 channel. Such a transcoder may be constructed with a transcoder for each channel and a transcoder delay device for each channel except the first channel. The transcoder delay devices for an E1 channel separator may be programmed with an incremental delay (e.g. in increments of 8 clock pulses) for detection of channels 2–32. After an appropriate delay a transcoder delay device would generate a channel sync pulse to a channel transcoder followed by transcoding of the appropriate channel.

I claim:

1. A method of de-interleaving ISDN channels within an ISDN channel separator, such method comprising the steps of:
   A) transmitting an ISDN synch pulse from an ISDN interface device to a first transcoder and to an at least first ISDN delay timer;
   B) de-interleaving a first ISDN channel within the first transcoder based, at least in part, upon the ISDN synch pulse;
   C) generating an at least first ISDN delay pulse by the at least first ISDN delay timer based, at least in part, upon the ISDN synch pulse; and
   D) de-interleaving an at least second ISDN channel by an at least second transcoder based, at least in part, upon the at least first ISDN delay pulse.

2. The method as in claim 1 wherein the step of transmitting an ISDN synch pulse further includes the step of transmitting a clock pulse to the first and second transcoders and the first ISDN delay timer.

3. The method as in claim 1, wherein the step of de-interleaving the first ISDN channel further includes the step of transcoding the first ISDN channel.

4. The method as in claim 1 wherein the step of de-interleaving the at least second ISDN channel further includes the step of transcoding the at least second ISDN channel.

5. An ISDN channel separator comprising:
   A) an ISDN interface unit operable for transmitting an ISDN synch pulse and a data signal having at least first and second interleaved ISDN channel data;
   B) a first transcoder coupled to the ISDN interface unit, including first de-interleaving means operable for de-interleaving the first ISDN channel data from the data signal based, at least in part, upon the ISDN synch pulse;
   an ISDN delay timer coupled to the ISDN interface unit, and operable for receiving the ISDN synch pulse and generating an at least first ISDN delay pulse based, at least in part, upon the ISDN synch pulse; and
   D) a second transcoder, including second de-interleaving means, coupled to the ISDN interface unit and the ISDN delay timer, operable for receiving the first ISDN delay pulse and the data signal and de-interleaving the second ISDN channel data from the data signal based, at least in part, upon the first ISDN delay pulse.

6. The ISDN channel separator of claim 5 wherein the ISDN interface unit is further operable for transmitting a clock pulse to the ISDN delay timer and first and second transcoders.

7. The ISDN channel separator of claim 5 wherein the first transcoder is further operable for transcoding the first ISDN channel data.

8. The ISDN channel separator of claim 5 wherein the second transcoder is further operable for transcoding the second ISDN channel data.

9. A method of transcoding ISDN channels comprising the steps of: receiving an ISDN synch pulse from an ISDN interface device; generating a time delayed, second synch pulse based upon the ISDN synch pulse; and transcoding a first one of the ISDN channels in a first transcoder based upon the ISDN synch pulse and transcoding a second one of the ISDN channels in a second transcoder based upon the second synch pulse.

10. The method of claim 9 wherein the step of generating a time delayed second synch pulse further comprises the step of delaying the second synch pulse following the ISDN synch pulse for an integral number of clock pulses.

11. An apparatus for transcoding plural ISDN channels comprising: means for receiving an ISDN synch pulse from an ISDN interface device; timer means, coupled to the ISDN interface device, for generating a time delayed, second synch pulse based upon the ISDN synch pulse; and means, coupled to the ISDN interface device and timer means, for transcoding plural ISDN channels based upon both the ISDN synch pulse and second synch pulse.

12. The apparatus of claim 1 wherein the means for generating a time delayed second synch pulse further comprises a counter for delaying the second synch pulse following the first synch pulse for an integral number of clock pulses.

13. The apparatus of claim 11 wherein the means for transcoding comprises a first transcoder operable for transcoding a first ISDN channel in response to the ISDN the synch pulse.

14. The apparatus of claim 13 wherein the means for transcoding further comprises a second transcoder coupled to the ISDN interface device and timer means, and operable for transcoding a second ISDN channel in response to the second synch pulse.

15. A method of transcoding ISDN channels within a cellular base station using a plurality of transcoders of the cellular base station, such method comprising the steps of: receiving an ISDN synch pulse from an ISDN interface device; generating a time delayed, second synch pulse based upon the ISDN synch pulse; and transcoding a first one of the ISDN channels in a first one of the plurality of transcoders in response to the ISDN synch pulse and transcoding a second one of the ISDN channels in a second one of the plurality of transcoders in response to the second synch pulse.

* * * * *

UNITED STATES PATENT AND TRADEMARK OFFICE
CERTIFICATE OF CORRECTION

PATENT NO. : 5,455,829
DATED : 10/3/95
INVENTOR(S) : Klingberg, Jeffrey W.

It is certified that error appears in the above-indentified patent and that said Letters Patent is hereby corrected as shown below:

Column 5, line 51 reads "an ISDN delay timer" should be
--C) an ISDN delay timer--.

Column 6, line 33 reads "The apparatus of claim 1" should be
--The apparatus of claim 11--.

Signed and Sealed this

Sixth Day of August, 1996

BRUCE LEHMAN

*Attest:*

*Attesting Officer*   *Commissioner of Patents and Trademarks*